Jan. 26, 1971    A. G. BOWLES    3,557,405
AUTOMATED MULTICAVITY ISOSTATIC PRESS
Filed Feb. 4, 1969    5 Sheets-Sheet 1

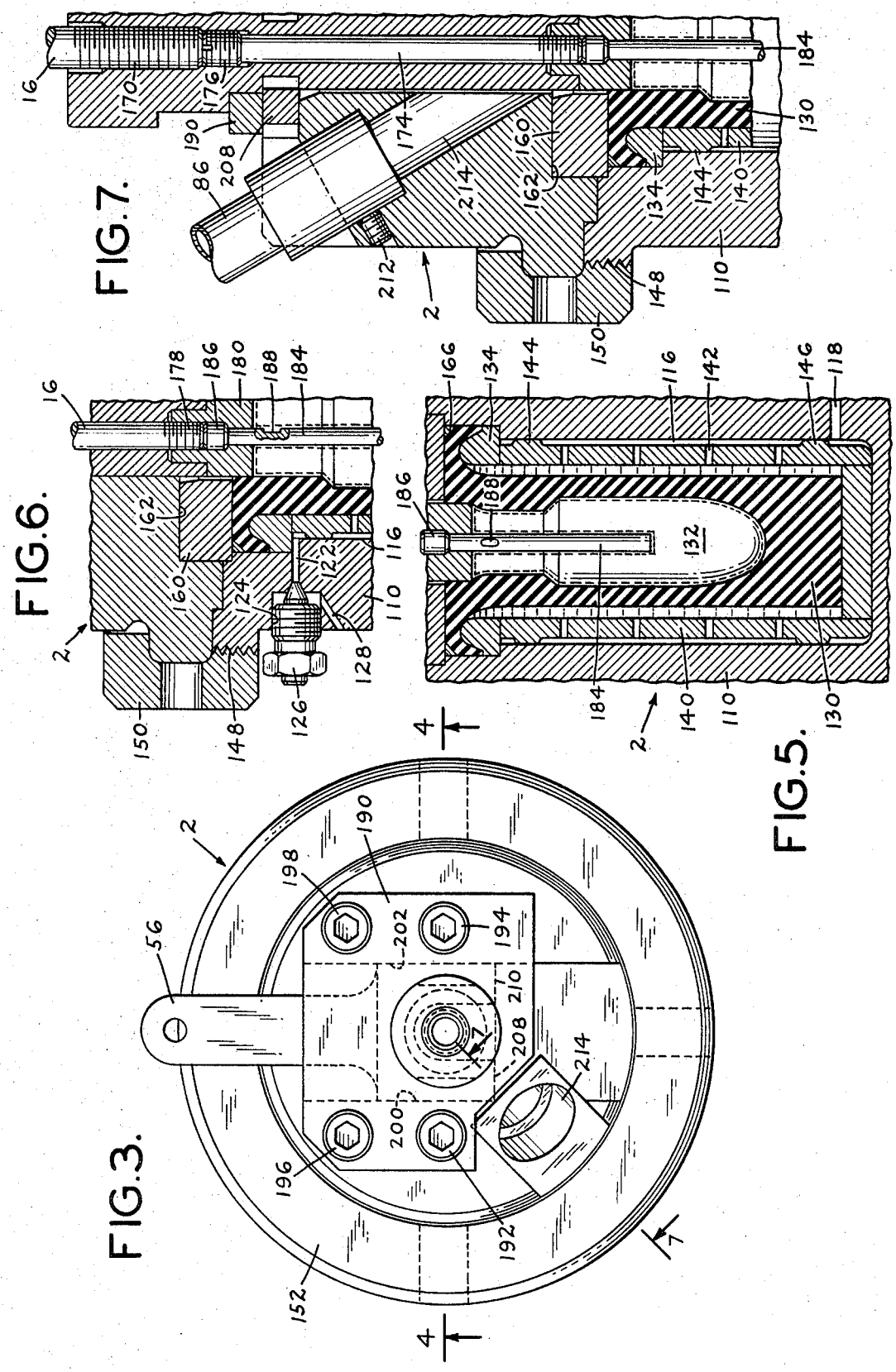

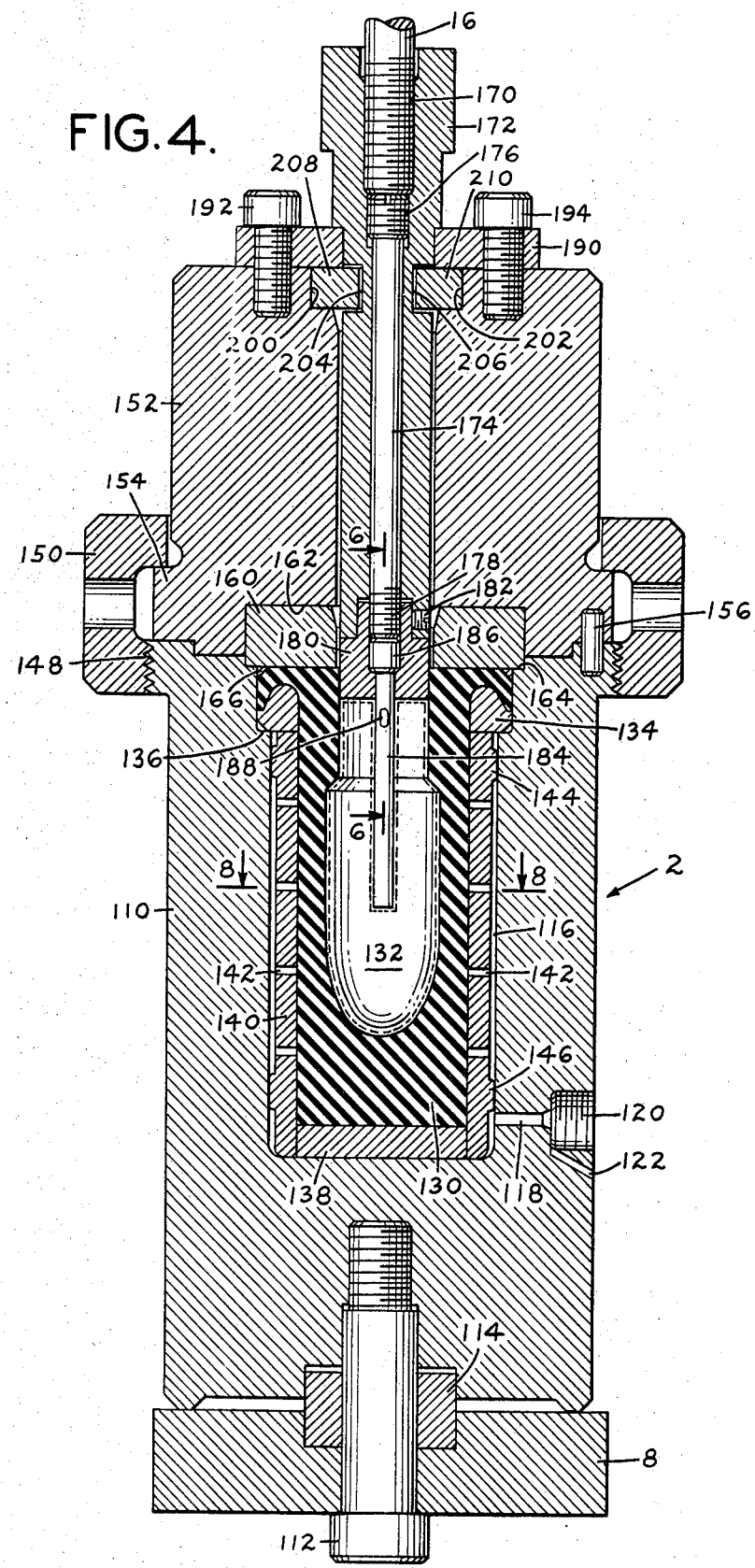

Jan. 26, 1971 A. G. BOWLES 3,557,405
AUTOMATED MULTICAVITY ISOSTATIC PRESS
Filed Feb. 4, 1969 5 Sheets-Sheet 5
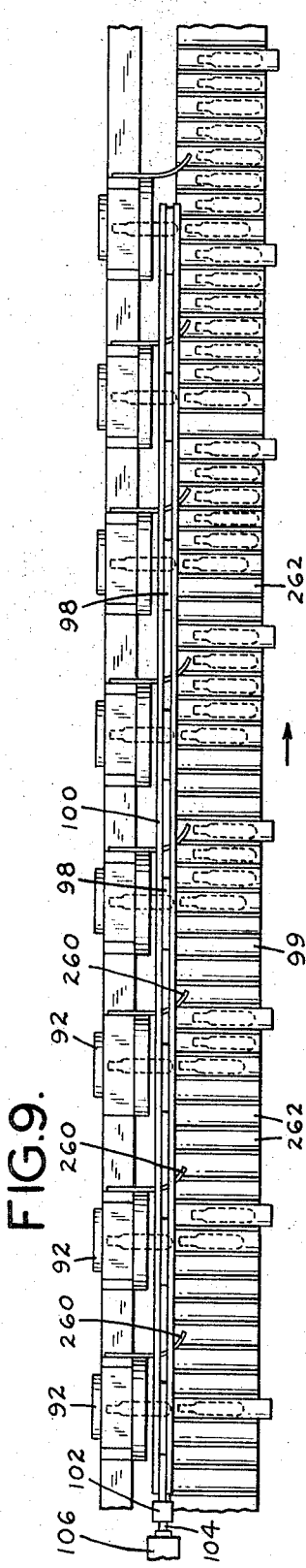
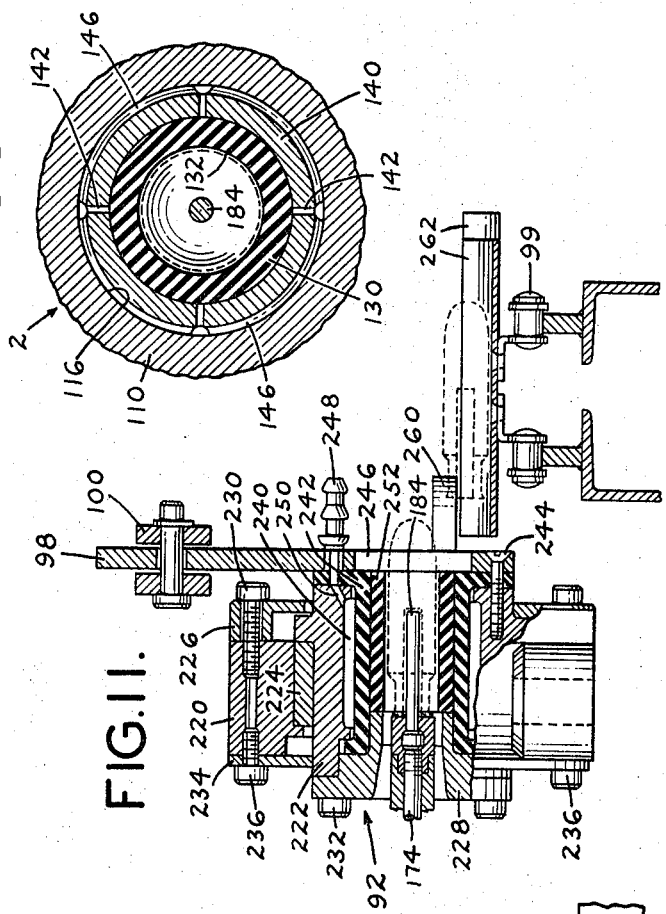
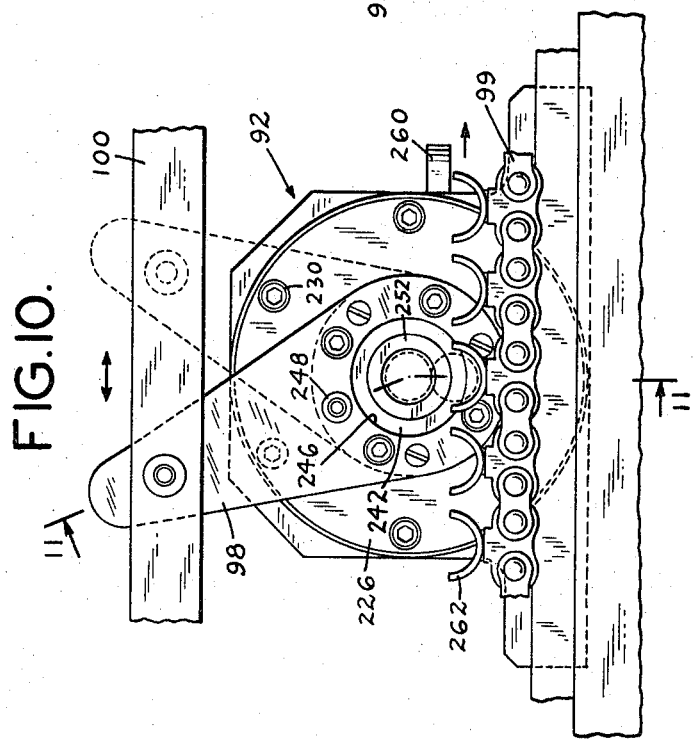

United States Patent Office

3,557,405
Patented Jan. 26, 1971

3,557,405
AUTOMATED MULTICAVITY ISOSTATIC PRESS
Arnold Gordon Bowles, Warren, Pa., assignor to National Forge Company, Irvine, Pa., a corporation of Delaware
Filed Feb. 4, 1969, Ser. No. 796,429
Int. Cl. B29c 3/04
U.S. Cl. 18—5                                   6 Claims

ABSTRACT OF THE DISCLOSURE

A multicavity isostatic press having a plurality of pressure vessels, each vessel having a pressure chamber and an elastomeric container in the pressure chamber, said elastomeric container having a cavity for receiving powder to be molded, a mandrel having an extension for insertion into the powder cavity of the elastomeric container, metering means for delivering a metered charge of powder to the container cavity, means for inserting the mandrel and for withdrawing the mandrel and means for removing isostatic molded articles from the mandrel extension and for transferring the molded article to a conveyor.

---

This invention relates to an isostatic press vessel and, more particularly, to a plurality of such vessels, arranged and operated simultaneously, for simultaneous production of a plurality of isostatic molded articles and for the simultaneous removal and transfer of the molded articles to a conveyor.

In the isostatic pressing of ceramic, clays, porcelains, and the like, the powder to be pressed is fed into the cavity of an elastomeric container, usually rubber, the container is sealed in a pressure chamber and the pressure chamber is pressurized, usually hydraulically. Hydraulic pressure on the elastomeric container compresses the container and compacts the powder in the container. The pressure in the chamber is then released. As the pressure is released, the elastomeric container expands and, in expanding, releases the compacted powder which is now molded into a self-sustained article of a shape determined by the inner configuration of the container cavity. Such compact article is then removed from the cavity and, usually, is heated, or "fired" and, after firing, may be machined, ground, or the like, into the desired, final shape. Insulators, such as the insulator parts for spark plugs, are one example of isostatic pressed articles that are fired and then machined or ground.

The instant invention is concerned with an isostatic press in which the powder to be molded is automatically metered and fed, in a metered amount, into the cavity of the elastomeric container in a pressure chamber, a mandrel is then inserted into the powder in the cavity and the cavity and chamber are then sealed and locked. The chamber is next hydraulically pressurized and compresses the container and the powder in the container cavity, compressing the powder around the inserted mandrel. The hydraulic pressure is thereafter released and, preferably, a negative pressure is applied to bring the container to its relaxed, or normal shape as rapidly as possible. The chamber is next unlocked and the mandrel, with the powder compacted thereon in its molded shape, is withdrawn. The molded article is removed from the end of the mandrel, preferably by applying a twist and turning the article as it is pulled away from the mandrel. The molded article, removed from the end of the mandrel, is automatically placed on a conveyor. Preferably, in the practice of the instant invention a plurality of presses, for example, eight, are arranged in longitudinal alignment and operated, automatically and simultaneously. All such presses are loaded, locked, pressurized, and unlocked at the same time. In such operation, the molded articles are removed, all at the same time, from the mandrels and transferred to the conveyor.

The entire operation, from the metering and feeding of the powder to the cavities to the removal and transfer of the molded articles to the conveyor, is performed automatically. Thus, other than to start and stop the machine, assure adequate supply of powder and to adjust or repair the machine, from time to time, no operator is required.

The instant invention will be more fully understood from the following description and drawing of the preferred embodiment in which:

FIG. 3 is a view taken along line 3—3, FIG. 2, and in enlarged scale;

FIG. 4 is an enlarged view, partly in section, along line 4—4, FIG. 3 and showing the pressure chamber closed and locked, with the cavity of the container filled and the mandrel in place but before pressure is introduced into the chamber;

FIG. 5 is a view, partly in section, of the pressure chamber of FIG. 4, at a reduced scale, and showing the chamber pressurized;

FIG. 6 is a view, partly in section, taken at 6—6, FIG. 4;

FIG. 7 is a view, partly in section, taken at 7—7 FIG. 3;

FIG. 8 is a view, in section, taken at 8—8, FIG. 4;

FIG. 9 is a top plan view of the conveyor of FIG. 1 and showing the conveyor in full length for an eight press machine;

FIG. 10 is an elevational view of the arm for turning and releasing the molded articles, taken at 10—10, FIG. 2, and showing the conveyor, the conveyor chain and certain of the associated units; and FIG. 11 is a view, partly broken away and in section, taken at 11—11, FIG. 10.

Figure 1:
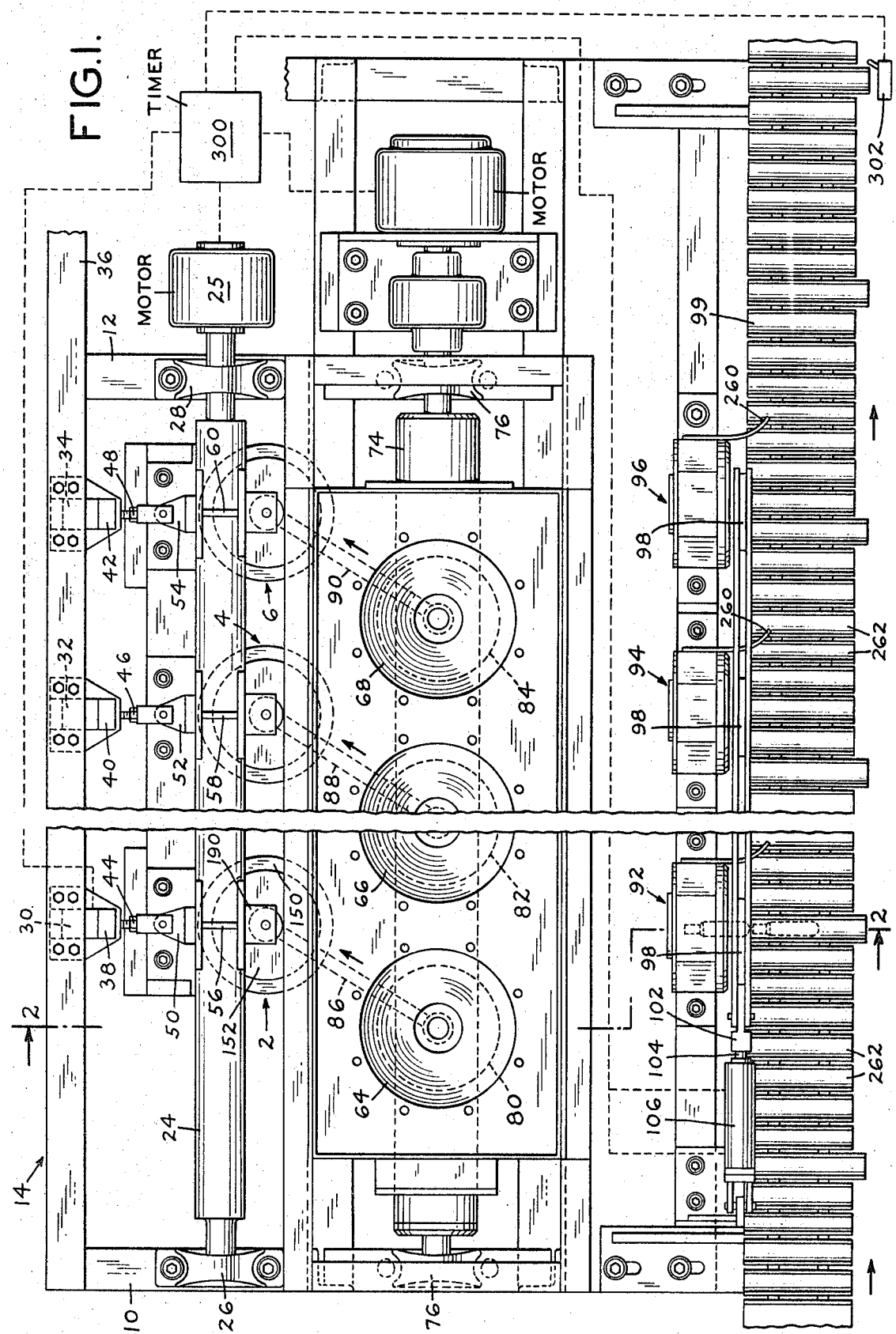
FIG. 1 is a top plan view of the machine of the instant invention with the center portion broken away and removed and the powder hopper removed.
Figure 2:
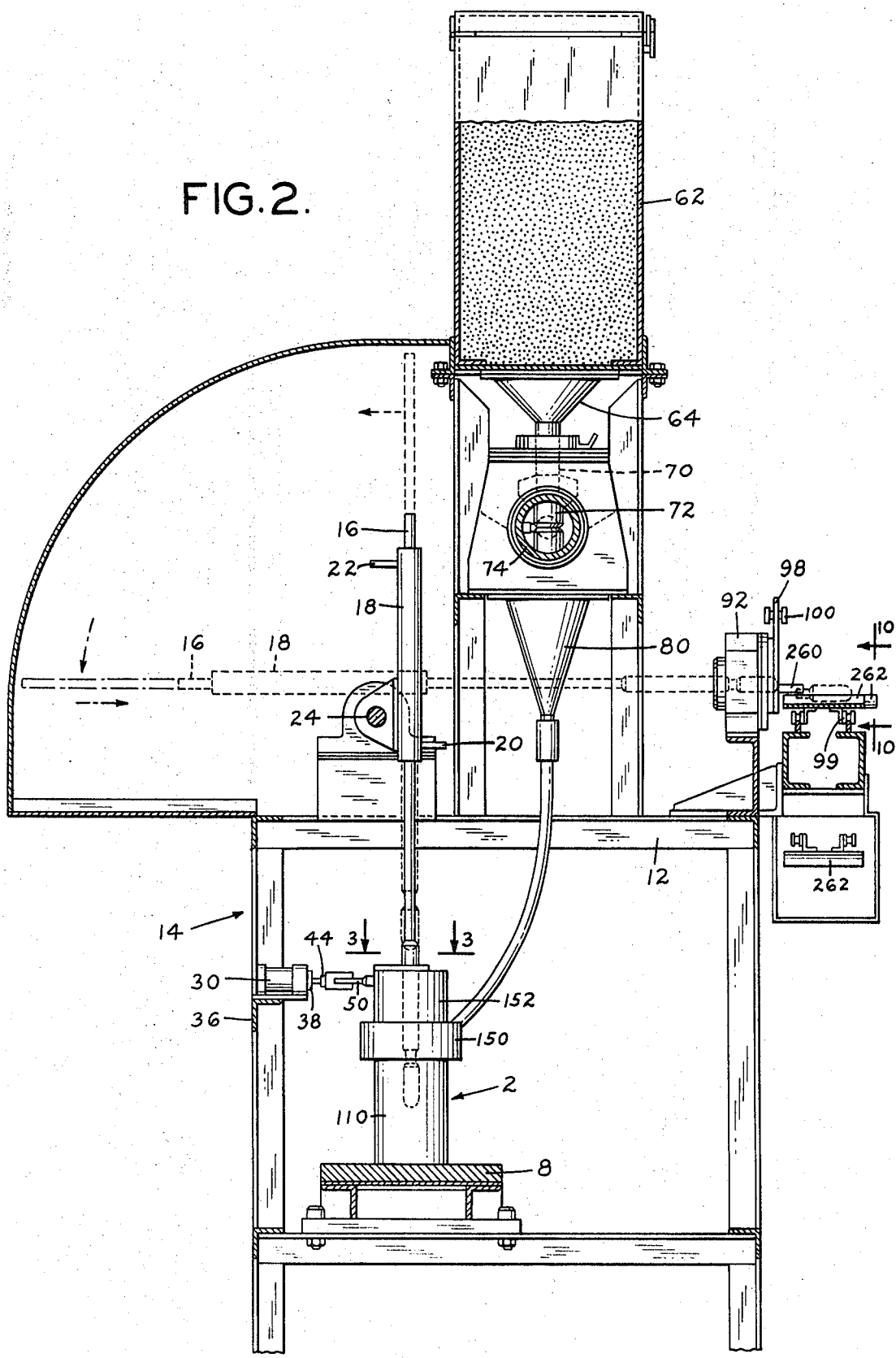
FIG. 2 is a view, partly in section, taken at 2—2, FIG. 1, showing one of the presses in elevation and the hopper.

Referring to the drawings, and particularly FIGS. 1 and 2, pressure vessels, generally designated 2, 4, 6, which are identical and, in the preferred embodiment of the invention there are eight, although with suitable modifications and adjustments to the conveyor, and the timing thereof, a smaller or larger number of identical pressure vessels might be utilized, are mounted, in longitudinal alignment, on plate 8 fixed, at its opposite ends, to cross members 10, 12 of frame, generally designated 14. Mandrel piston rod 16, FIGS. 2, 4, 6 and 7, passes through mandrel actuating cylinder 18. A piston, not shown, is fixed to rod 16 in cylinder 18 for raising and lowering mandrel piston rod 16 when cylinder 18 is energized through air conduits 20, 22. Mandrel piston rod 16 and cylinder 18 are keyed to shaft 24 of motor 25. Shaft 24 is mounted in bearings 26, 28, fixed to cross members 10, 12. When shaft 24 is rotated, as hereinafter described, mandrel piston rod 16 and mandrel actuating cylinder 18 are pivoted about the axes of shaft 24 from the full to the phantom line position shown in FIG. 2.

Air cylinders 30, 32, 34, one for each pressure vessel, are mounted, in fixed position, on longitudinal frame member 36, at one side of the pressure vessels 2, 4, 6. Pistons 38, 40, 42 of air cylinders 30, 32, 34 are connected, respectively, by piston rods 44, 46, 48 to the yoke 50, 52 54 of pressure vessel locks 56, 58, 60.

Powder supply hopper 61, mounted, at its opposite ends on cross members 10, 12 of frame 14, extends longitudinally of pressure vessels 2, 4, 6 and, at each pressure vessel, feeds into metering funnel 64, 66, 68, there being one metering funnel for each pressure vessel. At its bottom, each metering funnel 64, 66, 68 is connected to an upper powder conduit 70 which, at its lower end, feeds into metering port 72 of metering shaft 74, mounted for rotation in bearing 76, 78, fixed to frame 14. As more fully described later herein, metering shaft 74, when metering port 72 is in its upward position, receives a metered charge of powder from hopper 62 and metering funnel 64, 66, 68 and, when metering port 72 is in its downward position, discharges the metered charge of powder into lower funnel 80, 82, 84 and, through powder conduits 86, 88, 90, into pressure vessels 2, 4, 6, as later described.

Strippers, generally designated 92, 94, 96, there being one stripper for each pressure vessel, are mounted on frame 14 above chain conveyor 99. Arms 98, FIG. 10, of strippers 92, 94, 96 are linked together by plate 100 connected by yoke 102 to piston rod 104 of cylinder 106, FIG. 1.

As has been noted above, in the apparatus of the instant invention, the pressure vessels are identical whether there be eight such vessels, as in the preferred embodiment, or more or less such pressure vessels. In the following description, only one of the vessels, vessel powder feeds, vessel locks and strippers will be described, it being understood that, in the preferred embodiment, all of such vessels are identical and the description that follows applies to each such vessel.

Referring to FIG. 4, lower vessel housing 110 is fixed to plate 8 by bolt 112 extending upwardly through plate 8 and spacer 114 and is threaded into the end of housing 110. At its upper end, lower vessel housing has a cavity 116 extending downwardly from the top of housing 110 which cavity, at its lower end, is connected by port 118 to tapped opening 120 for receiving a pressure fitting, not shown. Tapped opening 120 is vented through a feed passage 122, for purposes hereinafter described. Near its upper end, FIG. 6, cavity 116 is vented by air bleed port 122 to tapped opening 124 having air bleed valve 126 and air bleed passage 128.

Container 130 of elastomeric material, such as rubber, and having an inner cavity 132 for receiving and molding powder under isostatic pressure, as hereinafter described, is positioned in cavity 116 of lower vessel housing 110 and is held in fixed position, at its upper end, by washer 134 mounted on step 136 in the wall of lower vessel housing cavity 116. At its lower end, container 130 is supported on spacer 138 resting on the bottom of cavity 116. Sleeve 140, having ports 142 and upper and lower spacer lugs 144, 146 for centering sleeve 140 in cavity 116, supports the vertical walls of container 130, for reasons later described.

At its upper end, lower vessel housing 110 is threaded, at 148, and receives mounting ring 150. Mounting ring 150, through threads 148, mounts upper vessel housing 152 on lower housing 110, shoulder 154 of upper housing 152 engaging mounting ring 150. Pin 156 extends upwardly from the top of the lower housing 110 into the bottom of upper housing 152. Spacer 160, mounted in a recess 162 in the lower end of housing 152 and recess 164 in the upper end of housing 110, engages the upper end of container 130. Filler washer 166 is positioned between the lower face of spacer 160 and the outer peripheral edge of container 130 for locking container 130 on washer 134 and for preventing extrusion of the elastomeric container as will be more fully understood from the description later herein.

Mandrel piston rod 16 is threaded, at 170 into mandrel guide rod 172. Mandrel pin 174 is threaded, at its upper end 176, into mandrel guide rod 172 and, at its lower end 178, into mandrel guide cap 180, mandrel guide cap 180 being locked to the lower end of mandrel guide rod 172 by set screw 182 for reasons later explained. Mandrel 184 having, at its upper end, collar 186, held in a shoulder in mandrel guide cap 180, projects downwardly through the bottom of mandrel guide cap 180. In its downwardly projecting portion, mandrel 188 has a small indenture or recess 188 for receiving isostatically compressed powder for reasons hereinafter explained.

Referring to FIGS. 3 and 4, lock plate 190 is attached to the upper end of upper housing 152 by bolts 192, 194, 196, 198, forming, between plate 190 and recesses 200, 202, in the upper end of upper housing 152, and recesses 204, 206 in mandrel guide rod 172, a guideway for yoke extensions 208, 210 of lock 56. Referring to FIG. 7, the end of powder conduit 86 is connected to upper vessel housing 152 by lock screw 212 and feeds powder into conduit 214 and into cavity 132 of container 130 when mandrel piston rod 16 and mandrel drive rod 172 are withdrawn.

With lock 56 and locking yoke extensions 208, 210 withdrawn from recesses 200, 202 in upper housing 152 and recesses 204, 206 in mandrel guide rod 172, mandrel piston rod 16 and the mandrel assembly is withdrawn from lower vessel housing 110 and upper vessel housing 152 and, by rotating metering shaft 74, a metered amount of powder to be molded is fed through conduit 86 into cavity 132 of container 130. Mandrel piston rod 16 and the mandrel assembly are re-inserted through upper housing 152 by actuating mandrel actuating cylinder 18, forcing mandrel 184 into the powder charge in cavity 132 and the lower end of mandrel guide cap 180 into contact with the powder in cavity 132. Lock 56 is actuated by air cylinder 30, re-engaging lock yoke extensions 208, 210, in the recesses 200, 202, in upper housing 152 and recesses 204, 206 in mandrel guide rod 172. Hydraulic fluid, under pressure, is introduced through port 118 into cavity 116 of lower housing 110.

In the initial cycle, as the hydraulic fluid is introduced into cavity 116, air bleed valve 126 is opened until all of the air in cavity 116 has been bled out of the cavity and the air valve is then closed. Thus, in the repeated cycle operations of pressure vessel 2, and such additional pressure vessels as are in operation in the apparatus, in the preferred embodiment a total of eight, the space between the outer wall of container 130 and cavity 116 remains filled with hydraulic fluid, all air, having been purged.

With the air purged from cavity 116, the hydraulic fluid, under pressure, compresses container 130 and compacts the powder sealed in container cavity 132, the amount of hydraulic pressure applied to cavity 116 depends upon the powder used and the extent to which such powder is to be compacted. In any event, for purposes of the instant apparatus, the powder, when compacted, must be in a self-sustained unit. The indenture or recess 188 in mandrel 184 acts as a key between mandrel 184 of the compact mass for reasons obvious hereinafter.

After cavity 116 has been pressurized, container 130 compressed and the powder in container cavity 132 compacted, pressure is released from cavity 116 and, preferably, a negative pressure is applied to the cavity to assure re-expansion of container 130 and to draw the outer wall of the container into contact with the inner wall of sleeve 140. As best shown in FIG. 5, when compacted, the space in cavity 132 occupied by the compressed powder is less than the volume of the initial powder charge. The diameter of the compact powder body is equal to or slightly less than the diameter of mandrel guide rod 172.

With the powder compacted and pressure released from cavity 116, preferably with the cavity at a slightly negative pressure, lock 56 and light yoke extensions 208, 210 are withdrawn by actuating cylinder 30. Mandrel actuating cylinder 18 is then actuated to withdraw mandrel piston rod 16 with the associated mandrel assembly and with the compact article compressed on mandrel 184 and held thereon by the powder compressed into indenture or recess 188 on mandrel 184. The mandrel assembly and compact powder article is lifted upwardly and out of upper housing 152 and is then pivoted by shaft 24 and motor 25 into alignment with stripper 92. Mandrel actuating cylinder 18 is again actuated and pistons the end of mandrel 184, with the compact article thereon, in stripper 92.

Referring to FIGS. 10 and 11, stripper 92 has outer annular housing 220, inner annular housing 222 and spacer 224, clamped together and assembled between outer ring 226 and inner ring 228 with screws 230, 232, respectively. Plate 234 is clamped to the inner side of outer annular housing 220 with screws 236. Around its inner surface inner housing 222 has an annulus 240. Resilient sleeve 242, preferably rubber, is clamped, at its inner end, between inner housing 222 and inner ring 228 and, at its outer end, between arm 98 and inner annular housing 222 by screws 244 around opening 246 in arm 98. Air pressure fitting 248 is mounted on arm 98 and is connected, through air passage 250, to annulus 240. Resilient sleeve 242 forms an airtight chamber with annulus 240. Wear sleeve 252, preferably rubber, is mounted on the outer surface of resilient sleeve 242. Resilient sleeve 242 and wear sleeve 252 may be of one piece, but preferably, are two pieces so that the inner sleeve 252 may be removed and replaced as wear occurs.

When mandrel piston rod 16 and the mandrel assembly with the compacted article on mandrel 184, is pivoted by shaft 24 and motor 25 about the axis of shaft 24 to the phantom line position in FIG. 2, mandrel actuating cylinder 18 is again actuated advancing mandrel 184, with the compacted article thereon, into sleeve 252 of stripper 92. Air or hydraulic fluid, under pressure, is then introduced through pressure fitting 248 into annulus 240, expanding sleeves 242, 252 into gripping engagement with the compacted article on the end of mandrel 184. Mandrel actuating cylinder 18 is then actuated in the reverse direction and, as cylinder 106 is actuated and advances plate 100 to arm 98. Stripper 92, turns the compact article on mandrel 184 and, as mandrel piston rod 16 and the mandrel assembly with mandrel 184 is withdrawn, toward the left in FIGS. 2 and 11, the compact article is held in stripper 92. Air is then exhausted from annulus 240, leaving the compact article resting in resilient sleeve 252. The following, advancing compact article, as it enters stripper 92, pushes the compact article left in the stripper by the previous operation onto cradle 262 of conveyor chain 99, operated in timed sequence with the pressure vessels, mandrel actuating cylinders and strippers, as will be described.

Referring now to FIGS. 1, 9 and 10, as hereinbefore noted, the preferred embodiment of the invention employs eight pressure vessels and associated powder metering and feeding, vessel locking and stripper mechanisms. Thus, in FIGS. 1 and 9 a conveyor for receiving eight molded and compacted articles, one from each pressure vessel, is illustrated. In each operating cycle of the illustrated machine, eight compact molded articles are positioned in strippers 92 and, on the next operating cycle, are pushed from strippers 92 onto conveyor 99. Conveyor 99 is arranged in units of eight cradles 262 with the units following, one after the other. Conveyor 99 is operated discontinuously, that is, after the compacted molded articles are discharged from stripper 92, the conveyor advances eight cradles. The eight strippers 92, along the length of the conveyor, as illustrated in FIG. 9, are positioned to discharge the compact molded article onto the cradle next following the cradle onto which the preceding stripper 92 discharged its compact molded article. Thus, in each eight cradle unit (starting from the left in FIG. 9), the first stripper 92, discharges its compact molded article onto the first cradle 262 of the eight cradle unit, the second stripper 92 discharges onto the second cradle 262 in the eight cradle unit, the third onto the third cradle 262, etc. As the conveyor advances from the eighth stripper 92, at the right-hand end of FIG. 9 of the eighth unit embodiment of the invention illustrated, all of the cradles 262 are filled. As the conveyor advances the discharged compact article past spring guide 260, the compact molded article is pushed across the conveyor, toward the bottom of FIG. 9, so that, as it advances past the next discharge station, the end of the compact molded article in strippers 92 will not interfere with the compact molded article on the conveyor.

As shown, diagrammatically, in FIG. 1, and for reasons obvious from the foregoing description, the various operating units of the automatic machine of the instant invention are connected to, and their operation controlled by, timer 300. Microswitch 302 actuated by cradle 262 of each eigth cradle unit of conveyor 99 is connected to timer 300. Timer 300 can be connected to the operating units mechanically, electrically, hydraulically or pneumatically so long as, in the operation of the machine, the various units are operated by timer 300 in the required sequence.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An isostatic press for molding of powder, said press having a plurality of pressure vessels, each of said pressure vessels having an upper housing and a lower housing, a fluid pressure cavity in said lower housing, and elastomeric container in said fluid pressure cavity, said container having a cavity open at one end for receiving powder to be molded and forming, at said open end, a pressure tight seal with the wall of said fluid pressure cavity, a sleeve having fluid passageways therethrough in said fluid pressure cavity and surrounding said elastomeric container for supporting said container, a mandrel receiving passageway extending through said upper housing and in alignment with said open end of said container cavity, a mandrel assembly in alignment with said passageway, said mandrel assembly including a mandrel at the lower end of said mandrel assembly for insertion into said container cavity and a cap for sealing said open end of said container cavity, means for inserting said mandrel into said passageway and for inserting said mandrel extension into said container cavity and for inserting said cap into the open end of said container cavity to close said container cavity, said means for inserting said mandrel including means for withdrawing said mandrel, said mandrel extension and said cap from said passageway, locking means on said upper housing for locking said mandrel in said passageway, a stripper, means for pivoting said mandrel from alignment with said passageway into alignment with said stripper, means for inserting said mandrel extensions into said stripper, means on said stripper for engaging a molded article on said mandrel extension and for turning said molded article on said mandrel extension, means for withdrawing said mandrel extension from a molded article engaged by said engaging means on said stripper, conveyor means, means for discharging molded articles from said stripper to said conveyor, powder metering means and means for feeding powder to be molded from said powder metering means to said container cavity when said mandrel, said mandrel extension and said cap are withdrawn from said passageway.

2. An isostatic press for molding of powder as recited in claim 1 in which said mandrel assembly includes a mandrel guide rod, a mandrel piston rod threaded to one end of said mandrel guide rod, a cap fastened to the other end of said mandrel guide rod and a mandrel extending through, and projecting from, said cap.

3. An isostatic press for molding of powder as recited in claim 2 in which said mandrel extending beyond said cap has a recess for receiving powder isostatically compressed on said mandrel.

4. An isostatic press for molding of powder as recited in claim 3 in which said fluid pressure cavity has a ring which, at the open end of said container is engaged by said container, said ring supporting said container and forming with said container said pressure tight seal with the wall of said fluid pressure cavity.

5. An isostatic press for molding of powder as recited in claim 4 in which said sleeve has a plurality of spacer lugs in engagement with the wall of said fluid pressure cavity, said spacers centering said sleeve and said container in said fluid pressure cavity.

6. An isostatic press for molding of powder as recited in claim 5 including means for applying fluid pressure to each said fluid pressure cavity of said plurality of pressure vessels simultaneously and for applying a negative fluid pressure to each said fluid pressure cavity of said plurality of pressure vessels simultaneouly.

References Cited
UNITED STATES PATENTS

| | | | |
|---|---|---|---|
| 2,152,738 | 4/1939 | Jeffery | 25—45 |
| 2,517,902 | 8/1950 | Luebkeman | 18—5 |
| 3,034,191 | 5/1962 | Schaefer et al. | 25—45 |

CHARLES W. LANHAM, Primary Examiner

L. R. FRYE, Assistant Examiner

U.S. Cl. X.R.

25—45

UNITED STATES PATENT OFFICE
CERTIFICATE OF CORRECTION

Patent No. 3,557,405       Dated January 26, 1971

Inventor(s) Arnold G. Bowles

It is certified that error appears in the above-identified patent and that said Letters Patent are hereby corrected as shown below:

Col. 1, line 30 "ceramic" should be -- ceramics --;

3, line 55, delete "the" (second occurrence);

line 75, "mandrel 188" should be -- mandrel 184 -

4, line 64, "light" should be -- locking --;

5, lines 39-40, "resilent" should be -- resilient --

6, line 10, "eigth" should be -- eighth --;

line 27, "and" should be -- an --.

Signed and sealed this 19th day of October 1971.

(SEAL)
Attest:

EDWARD M. FLETCHER, JR.  
Attesting Officer

ROBERT GOTTSCHALK  
Acting Commissioner of Patents